UNITED STATES PATENT OFFICE.

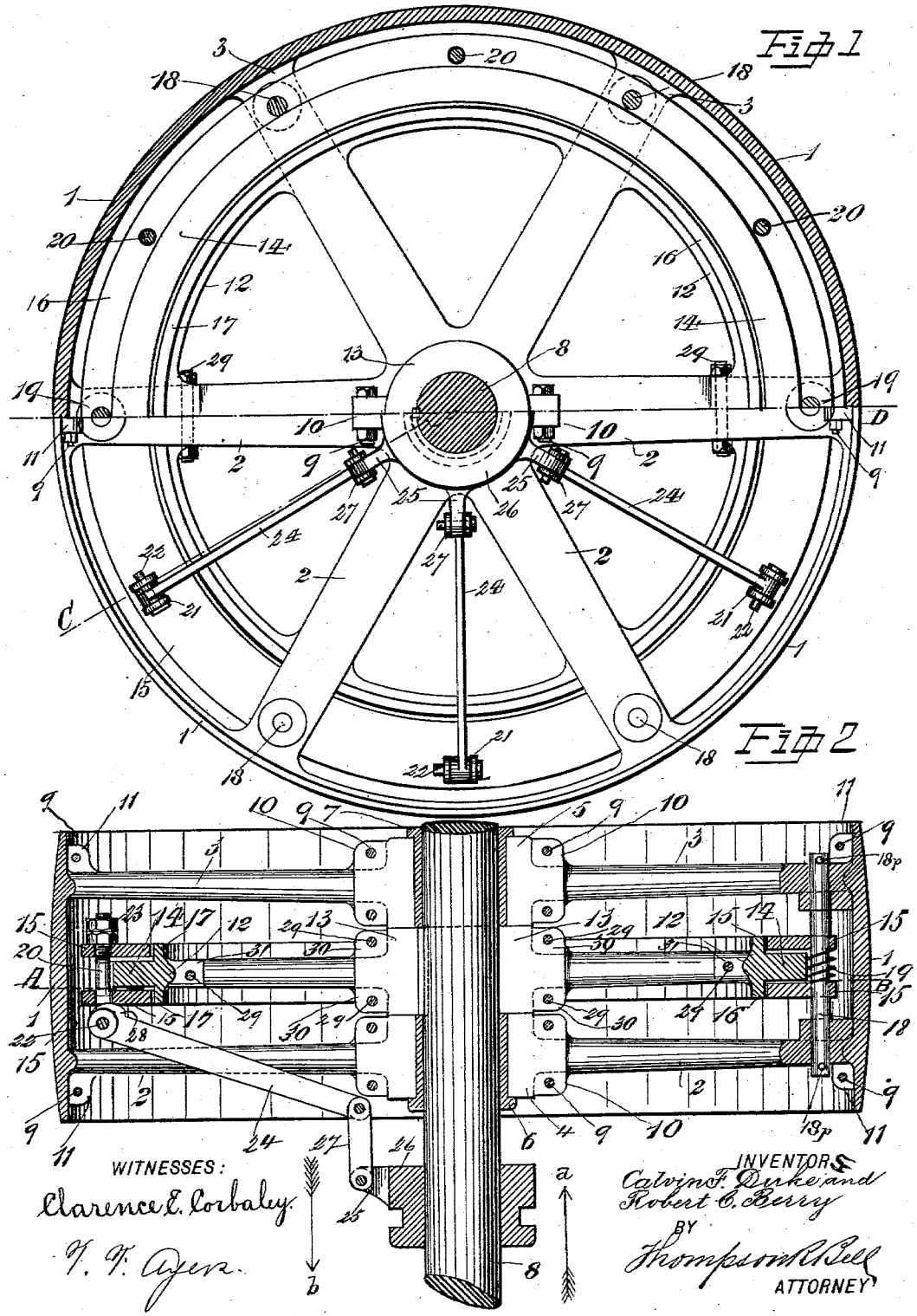

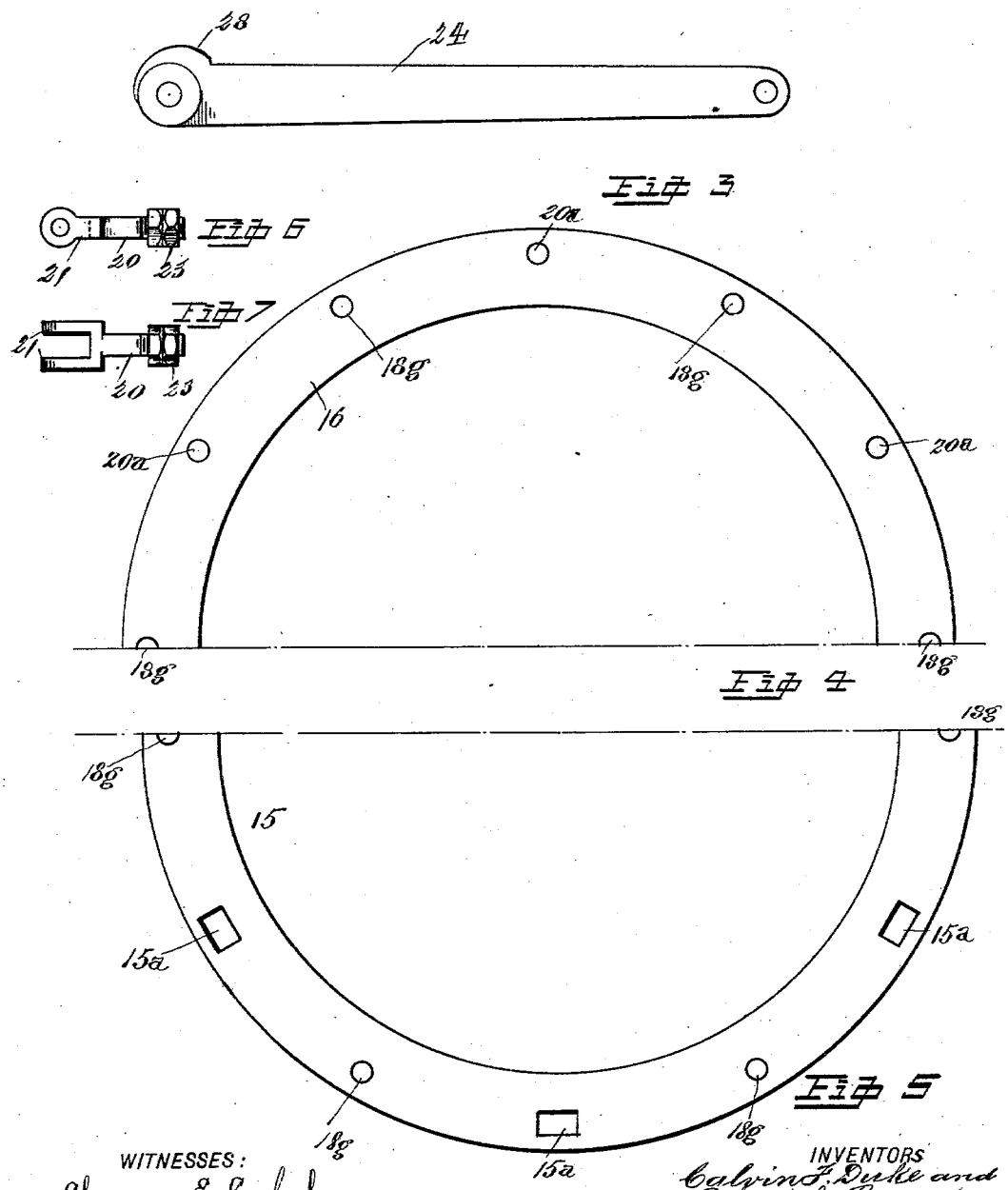

CALVIN F. DUKE AND ROBERT C. BERRY, OF INDIANAPOLIS, INDIANA.

FRICTION-CLUTCH PULLEY.

SPECIFICATION forming part of Letters Patent No. 717,557, dated January 6, 1903.

Application filed October 6, 1902. Serial No. 126,204. (No model.)

*To all whom it may concern:*

Be it known that we, CALVIN F. DUKE and ROBERT C. BERRY, citizens of the United States, residing at Indianapolis, in the county of Marion and State of Indiana, have invented new and useful Improvements in Friction-Clutch Pulleys, of which the following is a specification.

Our invention relates to certain new and useful improvements in friction-clutch pulleys and will be hereinafter more fully set forth.

The object of this our invention is to construct a friction-clutch pulley in such a manner that the fixed friction or grip pulley and the clutching means therefor will be situated within the outer belt-pulley and be completely inclosed therein and to construct such clutching or gripping means in such a manner that the stresses induced by such clutch mechanism will be directly applied to said friction-pulley in such a way as to maintain the entire structure in true position and centrally on the shaft upon which the pulley is mounted; also, to construct a clutch or gripping means that will be simple, durable, and effective in its operation. We attain these objects by means of the clutch mechanism illustrated in the accompanying drawings, in which similar numerals of reference designate like parts throughout the several views.

Figure 1 is a side elevational view of the clutch-pulley, showing the upper half portion in section and taken through the line A B. (See Fig. 2.) Fig. 2 is a transverse sectional view of the same taken through the line C D. (See Fig. 1.) Fig. 3 is an enlarged detail view of the cam-lever of the clutch mechanism. Figs. 4 and 5 are detail half-views of the friction-rings, and Figs. 6 and 7 are detail views of the fulcrum-bolts of the cam-levers.

The belt-pulley or main driving-pulley 1 is provided with the double arms 2 and 3 and the hubs 4 and 5, which latter are bored truly to accurately and tightly receive the bearing-bushings 6 and 7. The bushings 6 and 7 are preferably of brass or other suitable bearing metal, and the same are bored truly to freely turn on the main shaft 8. The main pulley 1 is necessarily constructed in halves and is what is well known as a "split" pulley, and the opposing halves constituting such pulley are securely bolted together by the connecting-bolts 9, which latter pass through the lugs 10, formed integral on the hubs 4 and 5 of the pulley 1, and the lugs 11, formed integral on the inner side of the rim of the pulley 1. Inclosed within the pulley 1 and situated concentrically therewith is the fixed friction-pulley 12, having the hub 13, the ends of which latter are faced truly to accurately fit between the inner faced ends of the hubs 4 and 5 to form a bearing therefor, and the friction-rim 14 of the said fixed friction-pulley 12 has its sides turned truly to form friction or gripping surfaces, and the said friction-pulley 12 is keyed or otherwise secured permanently on the shaft 8 to turn therewith. The main or belt pulley 1 is therefore maintained in position in a longitudinal direction on the shaft 8 by the hub 13 of the said friction-pulley 12 and by the same means is prevented from moving out of alinement with said friction-pulley 12.

The friction or gripping rings 15 and 16 are situated on opposite sides of the friction-rim 14, and the said rings are faced on their inner bearing-surfaces to form friction-surfaces, and said rings are bored to loosely fit over and around the side flanges 17 of the said friction-pulley 12, and said rings 15 and 16 are each maintained in position concentrically with said friction-pulley 12 by their guide-pins 18.

The guide-pins 18 are turned truly to freely and accurately fit the guideways $18^g$, formed in the rings 15 and 16, and said guide-pins are supported at their ends in the bores formed at the ends of the arms 2 and 3 of the main pulley 1, which bores are situated at a distance from the center of the latter pulley to clear the periphery of the friction-pulley 12, and the said guide-pins 18 are prevented from moving longitudinally in their bearing-ways and are removably secured therein by their retaining-pins $18^p$ or other suitable fastenings.

Separating coil-springs 19 encircle each of the guide-pins 18 intermediate the friction-rings 15, and the said springs are provided for the purpose of separating or spreading said friction-rings 15 and 16 apart and out of contact with the friction side surfaces of the friction-rim 14 of the friction-pulley 12. The tension-eyebolts 20 are forked at their eye ends 21, and the bores of the eyes of the said forks are adapted to encircle the fulcrum-pins 22, and the opposite ends of said tension-pins are threaded to receive the adjusting-nuts 23, which latter are provided not only as a means for connecting or tying the friction-rings 15 and 16, but may also be used as a means for adjusting the positions of the friction-rings 15 and 16 relatively to the friction-surfaces of the rim 14, and thus the wear of the said friction-surfaces may be readily taken up.

The friction-ring 15 is provided with the rectangular ways 15ª, into which the rectangular portions of the forked ends 21 of the tension-bolts 20 are loosely fitted, and in said friction-ring 15 is also formed the ways 18$^g$, which latter receive the guide-pins 18, and the ring 16 is provided with guideways 18$^g$, similar to those of the friction-ring 15 and provided for the same purpose, and holes 20ª are also formed in the said friction-rings 16, into which the threaded ends of the tension-bolts 20 loosely fit and through which they pass.

The cam-levers 24 are each fulcrumed on their fulcrum-pins 22 between the forked ends 21 of the tension-bolts 20, and the said cam-levers 24 have their free or power ends of their arms directed inwardly and radially toward the axis of the shaft 8 and are connected at said power ends to the radially-extending lugs 25, formed integral on the clutch-sleeve 26, by their connecting-links 27. The clutch-sleeve 26 is mounted on the shaft to turn and to slide longitudinally thereon, and the said clutch-sleeve is moved longitudinally in either direction along said shaft 8 by the usual or any well-known means (not shown) to swing or move said clutch or cam levers 24 inwardly or toward or outwardly from the pulley 1 to cause the friction-rings 15 and 16 to be moved either into or out of engagement. The cams 28 are all alike in form and are formed integral on the fulcrum ends of the cam-levers 24, and the said cams are each constructed to contact with the exterior side of the friction-ring 15 simultaneously, and all said levers 24 are operated simultaneously to draw said friction-rings 15 and 16 toward each other to clamp the friction-rim 14 of the friction-pulley 12 by means of the clutch-sleeve 26, hereinbefore described, which is traversed along the shaft 8 in the direction of the arrow $a$, and thereby causes the main belt-pulley 1 to be rotated along with the pulley 12. The clutch-sleeve 26 is moved outwardly along the shaft 8 in the direction of the arrow $b$ when it is required to disengage the cams 28 to release the friction-rings 15 and 16. It is clear that the clutch-sleeve 26 may readily be moved along the shaft 8 when said shaft is either in motion or at rest to engage or disengage the friction-rings 15 and 16 to cause the main belt-pulley 1 to rotate or remain at rest, as required.

The friction-pulley 12 may be also constructed in halves in a manner similar to the main belt-pulley, and each of the opposing halves are securely bolted together by their securing-bolts 29, which pass through the bores of the lugs 30, formed integral on the hub 13 of said friction-wheel, and the lugs 31, formed at or near the rim 14 of said wheel.

The operation of the device is so simple that a thorough understanding of the mechanism and the functions performed by the same will be readily had after an examination of the drawings, and a further detailed description will be unnecessary.

Having thus fully described this our invention, what we claim as new and useful, and desire to cover by Letters Patent of the United States therefor, is—

In a clutch-pulley, the combination with a main double-armed pulley having the outer hubs, as 4 and 5, said pulley adapted to turn on said shaft, of a fixed friction-pulley having side peripheral friction-surfaces and said pulley situated centrally within said main pulley and having its hub fitted between the outer hubs of said main pulley whereby the latter is held in position on said shaft, friction-ring guiding-pins passing through and supported at their ends by the double arms of said main pulley, opposing friction-rings situated adjacent to and opposite said side friction-surfaces of said friction-pulley, tension-pins situated intermediate each pair of guiding-pins and connecting said opposing friction-rings, a series of cam-levers fulcrumed on the ends of said tension-pins, said cam-levers having their cam ends contacting with one of said friction-rings and their inner power ends extending radially toward the axis of said shaft, a clutch-sleeve and connecting-links extending from said clutch-sleeve to the power ends of said cam-levers whereby the said cam-levers are actuated simultaneously.

In testimony whereof we have hereunto set our hands in the presence of two subscribing witnesses.

CALVIN F. DUKE.
      ROBERT C. BERRY.

Witnesses:
 THOMPSON R. BELL,
 CLARENCE E. CORBALEY.